A. BECKERS.
Improvement in Hand Stereoscopes.

No. 115,269.

Patented May 30, 1871.

Witnesses,

Alexander Beckers,
Lemuel W. Serrell
atty.

UNITED STATES PATENT OFFICE.

ALEXANDER BECKERS, OF NEW YORK, N. Y.

IMPROVEMENT IN HAND-STEREOSCOPES.

Specification forming part of Letters Patent No. 115,269, dated May 30, 1871.

*To all whom it may concern:*

Be it known that I, ALEXANDER BECKERS, of the city and State of New York, have invented an Improvement in Stereoscope Instruments; and the following is declared to be a correct description of the same.

In Letters Patent granted to me January 25, 1870, No. 99,135, a diaphragm is employed between the eyes and the picture to cut off the rays of light, so that only one image is visible, and this diaphragm is moved automatically as the picture is adjusted.

My present invention is for accomplishing the same object, especially in the open sliding picture-holders, where the lenses are in a hood, but there is not any box for the picture.

In my improved instrument the separator or diaphragm is adjusted by the movement of the picture, and the lenses are also adjusted relatively to the hood. In this instrument the lenses are moved away from the eye simultaneously with the movement of the picture to a greater distance, and the reverse, and hence the converging rays of light from the picture reach the eyes at such angles that a separator of given width (to which a proportionate adjustment is given, as hereafter named) will intercept rays of light from the left side of the right picture and the right side of the left picture, and the width of border or frame around the outer edges of the picture will be maintained nearly uniform, regardless of the position of the picture, because the distance of the square lenses from the eye is increased or decreased in the proper proportion to the increase or decrease of distance of the picture.

Figure 1:
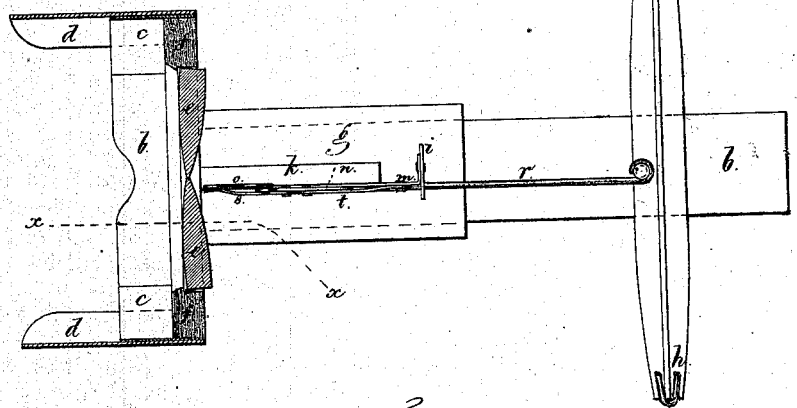
Figure 2:
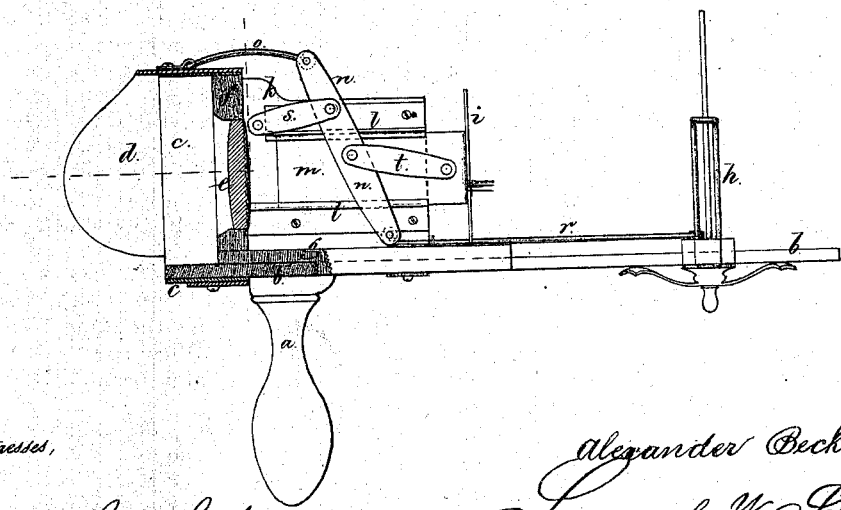

In the drawing, Figure 1 is a sectional plan of the stereoscope apparatus, and Fig. 2 is a section at the line $x\ x$.

The handle or holder $a$ is connected permanently to the base $b$, and at the end thereof is a metallic band, $c$, or other suitable connection for the hood $d$, that is of a shape adapted to setting against the forehead and at the sides of the eyes. The lenses $e$ are sustained in a head, $f$, that is upon the end of the slide $g$, set to move upon the body or base $b$. The picture-holder $h$ is of any ordinary construction, and is movable toward or away from the hood $d$ by sliding upon the base $b$ or in any other desired manner. The central division $k$ is fastened to the head $f$ and slide $g$, and upon this division are slides $l$, in which the tongue $m$ of the separator $i$ slides. The lever $n$ is connected at one end, by the link $o$, to the hood $d$, and at the other end, by the rod $r\ r$, with the picture-holder. The link $s$ extends from the lever $n$ to the division $k$ or head $f$, and the link $t$ extends from the lever $n$ to the tongue $m$ of the separator $i$. The link $o$ forms the fulcrum for the lever $n$, and the parts being properly proportioned the separator $i$ will be moved in the same direction as the picture in adjusting the latter, so also will the lenses; but the movement of the lenses will be much less than that of either the picture or the separator $i$. The motion of the lenses being further from or nearer to the eyes of the person looking at the picture, the lines of light will reach the eye so that the entire picture can be seen and only a certain width of border, whether the picture is close or distant, instead of the width of border increasing as the picture is moved away, as usual, thus rendering the area of vision on the picture nearly uniform. The movement given to the separator $i$ is to be so proportioned (by the relative lengths of the points of leverage) that it will prevent the right side of the left picture being seen by the right eye, or the left side of the right picture being seen by the left eye, thus allowing all parts of each picture to be seen, but preventing the images being duplicated.

It is to be understood that this apparatus might be made so as operate accurately with parties whose eyes are the same distance apart, and that for general use the apparatus is to be adapted to the average axial distance between the eyes.

In cases where the picture-holder is connected to the hood by means of cross-levers that swing like scissors, as have been used, instead of the slide shown, the separator may be connected with the hinge-pin of these cross-levers so as to receive the proportionate movement aforesaid as the picture is adjusted; and the swinging movement of these levers can be employed to move the lenses slightly nearer together as the picture is moved back, or the reverse, or sliding septa at the outer vertical edges of the lenses may be drawn toward each other as the picture is moved back, or the reverse; these adjustments being substantially the same as those before mentioned, and affecting the same objects.

I claim as my invention—

1. The lenses, made movable in relation to the surrounding hood, and connected with the picture so as to be adjusted simultaneously with the picture, substantially as and for the purposes set forth.

2. The lever *n*, applied between the hood and the picture-holder, and connected with the separator and with the head carrying the lens, substantially as set forth, so as give to the moving parts the proper position relative to the picture as the latter is adjusted, as set forth.

Signed by me this 14th day of April, A. D. 1871.

ALEX. BECKERS.

Witnesses:
 CHAS. H. SMITH,
 GEO. T. PINCKNEY.